No. 710,759. Patented Oct. 7, 1902.
E. P. COLEMAN & S. E. HITT.
MECHANICAL FRICTION BRAKE.
(Application filed Nov. 21, 1901.)
(No Model.) 2 Sheets—Sheet 2.
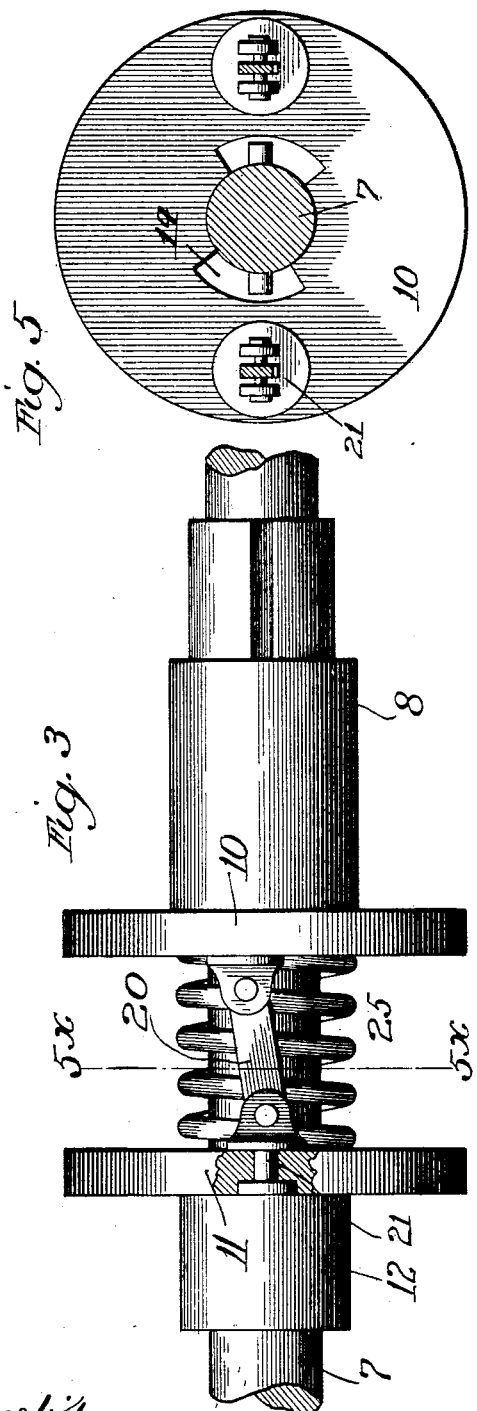
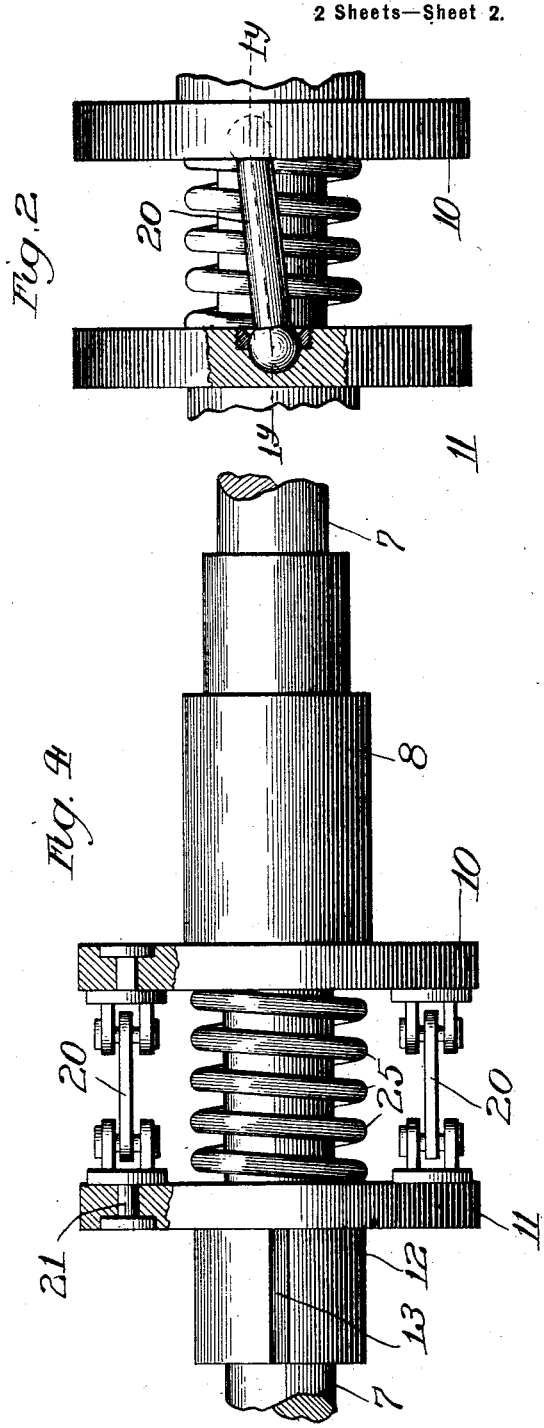

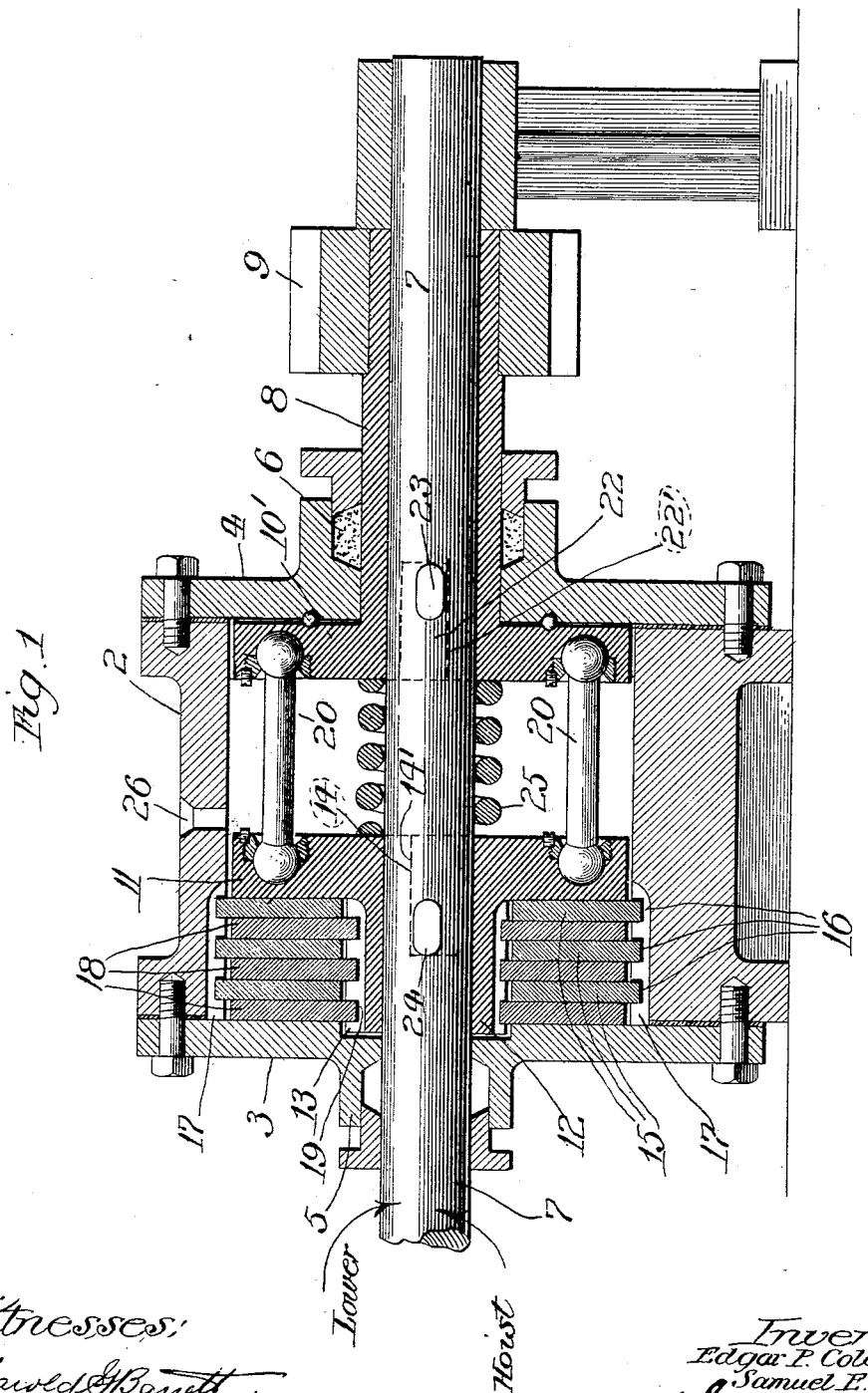

UNITED STATES PATENT OFFICE.

EDGAR P. COLEMAN AND SAMUEL E. HITT, OF CHICAGO, ILLINOIS.

MECHANICAL FRICTION-BRAKE.

SPECIFICATION forming part of Letters Patent No. 710,759, dated October 7, 1902.

Original application filed October 23, 1900, Serial No. 34,074. Divided and this application filed November 21, 1901. Serial No. 83,180. (No model.)

*To all whom it may concern:*

Be it known that we, EDGAR P. COLEMAN and SAMUEL E. HITT, of the city of Chicago, county of Cook, and State of Illinois, have invented certain new and useful Improvements in Mechanical Friction-Brakes, of which the following is a specification.

Our invention relates to hoisting machinery or similar apparatus in which there is a tendency for the load to turn the driving mechanism or motor backward, and more particularly to improvements in automatic mechanical brakes for jib, gauntree, or overhead traveling cranes operated usually by electric power.

Automatic friction-brakes as hitherto constructed are objectionable in their operation principally by reason of the fact that not more than two-thirds of the power of the driving-motor can be availed of for hoisting purposes after the brake has been set—that is, when the load-pressure is on the brake. They have been further objected to because of the vibrations produced by the apparatus during the lowering operation due to the intermittent gripping and releasing of the brake.

The primary object of our invention is to provide a mechanical brake which may be started with a very small expenditure of power over and above that which is required to actually hoist the load. To accomplish this, it is necessary to eliminate all possible friction between the driving-motor and the load-shaft of the brake at the moment of starting the load, and this has been impossible in the older forms of brakes, chiefly because of an equal distribution of friction between the driving and load shafts.

A further object of our invention is to provide a mechanical brake which shall oppose a considerable friction to the backward-turning movement of the driving-shaft during the lowering of the load, the advantage gained residing in a better control of the electric motor.

Another object of our invention is to provide a brake which during the lowering operation will not produce serious vibrations.

Our invention consists, generally speaking, in a mechanical brake comprising a stationary friction member, in combination with a revoluble friction member, a load-shaft and a driving-shaft, pressure means interposed between said load-shaft and said revoluble friction member, and means whereby said driving-shaft is caused to operate directly upon said load-shaft and pressure means when the driving-shaft is rotated positively and to operate directly upon the friction member when the load-shaft is rotated in a backward direction to lower the load.

Our invention further consists in the combination, with stationary and revoluble friction members and load and driving shafts, of pressure-exerting means comprising a head carried by the load-shaft and toggle-links extending between said pressure-head and the revoluble friction member, suitable means being provided upon the driving-shaft, load-shaft, and revoluble member for positively operating said head and said member; and, further, our invention consists in various constructions and in combination of parts, all as hereinafter described, and particularly pointed out in the claims.

Our invention will be more readily understood by reference to the accompanying drawings, forming a part of this specification, and in which—

Figure 1 is a vertical longitudinal section of a friction-brake embodying our invention. (See line 1$^y$ 1$^y$, Fig. 2.) Fig. 2 is a detached view of the friction-heads and toggle-links. Fig. 3 is a detached view of a modified form of toggle-link connection. Fig. 4 is a view of the same at right angles to that shown in Fig. 3, and Fig. 5 is a section on line 5$^x$ 5$^x$ of Fig. 3.

As illustrated in the drawings, 2 represents the casing of our mechanical brake. This casing is a drum or cylinder having a base by which it is attached to any suitable foundation.

3 and 4 are the ends or heads of the cylinder, and these contain bearings 5 and 6 for the shafts 7 and 8 of the brake. These bearings have packing-glands to retain the oil wherewith the casing is filled.

26 is the oil-hole of the casing and is the only place where oil need be applied to our brake.

The heads are firmly fastened to the cylinder 2, as they must take the thrust of the pressure-exerting means, which we arrange within the casing. The casing head or end 3 forms the stationary friction member of the brake.

11 is the revoluble friction member of the brake. This is journaled on the driving-shaft 7 and has a long hub or sleeve 12, which latter is provided with longitudinal grooves 13. The casing is provided with like longitudinal grooves 17. Between the friction member 11 and the end 3 we interpose a series of friction-disks 15 and 18, which, alternately considered, are attached or fastened to the hub 12 and to the casing 2 by means of lugs or keys on the disks engaging in the grooves 13 and 17. The disks 18 have holes through them to fit the hub, and the keys or lugs are integral parts of the disks, which extend into the grooves 13 of said hub. The disks 15 have no lugs extending inwardly, but instead have lugs 16, that extend into the grooves 17 in the casing or cylinder 2. Thus when the member 11 rotates the disks 18 will rotate with it, while the disks 15 will remain stationary with the head 3 of the casing. In this manner a very large frictional capacity is provided for within a very small space, and the friction that is derived from the total surface of these disks plus the surfaces of 11 and 3 greatly exceeds the friction which would be secured by the employment of only two plane surfaces, though of equivalent area.

The driving-shaft 7 extends entirely through the casing and is supported, preferably, by an outside bearing, as shown. The hoisting-shaft 8 is a sleeve journaled on the driving-shaft. It extends through the bearing 6 and carries the hoisting-pinion 9, whereon the load exerts its opposing force. On the inner end of the hoisting-shaft 8 is the pressure-head 10, for which the casing-head 4 serves as a thrust-bearing. The friction between the pressure-head 10 and the end 4 or thrust-bearing is reduced as much as possible. The surface exposed for contact is very small always, and we sometimes prefer to interpose a set of balls 10' between the pressure-head and the casing end 4.

25 is a coiled spring arranged around the driving-shaft and tending to force the pressure-head and the friction member 11 outward, it being desirable to hold the friction-disks always in contact, though not always under heavy pressure. The pressure means, device, or coupling is completed by the toggle or angular links 20, which extend between the pressure-head 10 and the friction member 11, their office being to approach perpendicular positions with relation to the head 10 and the friction member 11, and thus force said members apart, or, in other words, the head 10 being fixed by its thrust-bearing forces the friction member 11 tightly against the head 3 through the medium of its several friction-disks. The links 20 have preferably ball heads or ends, which are held in ball-sockets provided in the head 10 and the member 11. The socket-rings, as shown, are preferably adjustable to take up wear. As illustrated in Figs. 3 and 4, the ball-and-socket connections may be replaced by hinged joint connections, with one member of each joint swiveled in the opposite head or member 10 11. We consider, however, that there is greater opportunity for lost motion in this construction and prefer the ball-heads upon the links or struts 20. The normal or natural positions of the links 20 are shown best in Fig. 2, where it will be seen that the same occupy an acute position with relation to the heads or disks 10 11. It will be obvious upon reference to the drawings that the stationary friction member (the head 3 and stationary disks 15) opposes a considerable resistance to the revolution of the revoluble friction member—namely, the member 11 and associated revoluble disks 18. Therefore, for the moment disregarding the driving-shaft, it will be obvious that the backward-turning effort of the hoisting-shaft 8 will operate the pressure means—to wit, the head 10 and angular links 20—to force the revoluble friction member into still firmer frictional engagement with the stationary friction member, and as there is no force tending to turn the revoluble friction member except that which is exerted through the links or struts 20 the friction member will remain stationary and the pressure-head 10 will be kept from rotation through the bracing effect of the struts or links 20. It is in this manner that a load which has been raised is supported and kept from falling at any time when the driving-shaft is stopped. Thus far means are provided to effectually support a suspended weight or load; but in addition to this function of the brake it is necessary to enable a further lifting of the load, and it is also necessary to provide for lowering the load. To this end we provide means in connection with the driving-shaft for controlling the operations or relative movements of the pressure-head and the friction member 11. (The toggle-links are idle members except to the extent that they are struts or braces.) These controlling means comprise the pins or keys 23 and 24, which extend through or from the driving-shaft 7 and project into the recesses or notches 14 and 22, provided in the friction member 11 and the head 10, respectively. (See Figs. 1 and 5.) These notches are of greater width than the ends of pins or keys 24, so that the driving-shaft is allowed a slight movement independent of the members mounted thereon.

The operation is as follows: When the driving-shaft 7 is turned positively to hoist the load, (see arrow, Fig. 1,) the pin 23 engages with the ends or shoulders 22' of the notch or notches 23 in the sleeve 8 of pressure-head 10. The pin 24 does not engage positively with the friction member 11 at this time, and the result is that the pressure-head 10 is carried forward with relation to the friction member 11, and the angle of incidence of the links or struts 20 is increased and the friction-head 11 is drawn inward to decrease and in practice wholly relieve the driving-shaft from its frictional resistance. It will be noted that in thus turning the hoisting-shaft 8 and the friction-head 10 the driving-shaft encounters only the load exerted on the hoisting-shaft 8 plus the very slight frictional resistance of the ball or thrust bearing belonging to the pressure-head 10. The friction member 11, which has previously been firmly set or clamped by the backward-turning effort of the suspended load, is not turned at all until after the pressure has been relieved. In this feature our brake is notably different from others. After the load-shaft has been rotated to raise the load and when the driving-shaft is stopped the slight backward turning of the load-shaft due to the fall of the load instantly applies pressure to the friction member 11, and the backward rotation of the load-shaft 8 is stopped within a fraction of a revolution.

When it is desired to lower the load, the driving-shaft 7 is reversed—that is, it is turned backwardly—by the reversal of the driving-shaft electric motor, and instantly the pin 23 will leave its engagement with the shoulders 22 of the pressure-head, and the pin 24 will engage the shoulders 14' within the friction member 11, and the friction member 11 will then be positively turned against its own resistance. Being thus moved forward in advance of the pressure-head 10 it will operate to increase the angles of the links or struts 20, thus relieving the pressure upon the friction member 11 and permitting the head 10 to follow the turning or revolution of the friction member 11. In this manner a continuous backward rotation of the driving-shaft 7 results in a continuous decrement of the friction, and the load will fall steadily and without vibrations in the brake mechanism. During the lowering of the load the driving-shaft works against a resistance which, in effect, is slightly less than the force of the weight or load which it opposes. This prevents the motor from running away and is a particularly valuable feature where electric series motors are used, such motors being preferred on account of their easy and simple regulation and handling. Whenever the backward rotation of the driving-shaft is stopped, it is obvious that there will be an independent backward movement of the load-shaft and the pressure-head to instantly place the friction member under pressure and stop it, so that by it the ends of the struts or links will be anchored and prevent the further rotation of the head 10 and load-shaft.

In brief, our mechanical brake has the following advantages: Its parts are entirely inclosed. They may be kept always lubricated. The driving-shaft extends entirely through the device, so that there can be no disalinement of the parts. An extremely large frictional resistance is developed within a very small space, and this resistance is developed without great pressure. The torque required for starting a suspended load is little, if any, in excess of the torque required to actually raise the load. The resisting effort of the brake is instantaneous when the driving-shaft is stopped. The friction member opposes an almost constant resistance to the rotation of the driving-shaft, except during the actual hoisting operation, at which time it offers no resistance, and, finally, the parts are so constructed and assembled that the taking up of wear is substantially automatic, and all parts being subjected to pressure only and free from torque are more reliable, as well as of greater durability, than parts of the mechanical brakes hitherto employed.

It is obvious that various modifications of our invention will suggest themselves to those skilled in the art, and we therefore do not confine our invention to the specific construction herein shown and described.

This is a divisional application, the subject-matter hereof being derived from our pending application, entitled "Mechanical brakes for hoisting machinery," Serial No. 34,074, filed October 23, 1900, and attention is also directed to our pending application, entitled "Mechanical brakes," filed November 21, 1901, Serial No. 83,179.

Having thus described our invention, we claim as new and desire to secure by Letters Patent—

1. In a mechanical friction-brake, the combination with a stationary friction member, of a revoluble friction member, a load-shaft, pressure-exerting means interposed between said load-shaft and said revoluble friction member and attached to both, a driving-shaft and controlling means functionally connecting said driving-shaft and said pressure means, substantially as described.

2. In a mechanical brake, the combination with a stationary friction member, of a revoluble friction member, a load or hoisting shaft, a stationary thrust-bearing therefor, pressure-exerting means extending between said hoisting-shaft and said revoluble friction member and operatively dependent upon the relative rotary positions of said shaft and member, and means for positively rotating either said load-shaft or said friction member, substantially as described.

3. In a mechanical friction-brake, the combination with a stationary friction member, of a single revoluble friction member to co-operate therewith, a hoisting-shaft, a stationary thrust-bearing therefor, pressure-exerting means interposed between said hoisting-shaft and said revoluble friction member, adapted to exert pressure upon said revoluble friction member upon the relative backward rotation of said hoisting-shaft, and the driving-shaft for positively rotating said hoisting-shaft and said revoluble friction member in either direction to hoist and lower the load, respectively, substantially as described.

4. In a mechanical friction-brake, the combination with a stationary friction member, of a rotary friction member, a hoisting-shaft and driving-shaft whereon said rotary member and said hoisting-shaft are mounted, a fixed thrust-bearing for said hoisting-shaft, coupling means interposed between said driving-shaft and the parts mounted thereon and angularly-operative pressure means interposed between said hoisting-shaft and said rotating friction member, substantially as described.

5. In a mechanical friction-brake, the combination with a stationary friction member and a thrust-bearing, of a hoisting-shaft held by said thrust-bearing, a rotary friction member arranged between said stationary member and said thrust-bearing, angularly-operative pressure - exerting means operatively connecting said hoisting-shaft and said rotary member and means for positively driving, in opposite directions, said hoisting-shaft and said rotary member, substantially as described.

6. In a mechanical friction-brake, the combination with a stationary casing, of the driving-shaft extending therethrough a hoisting-shaft mounted on said driving-shaft and extending through the end of said casing a rotary friction member arranged within the casing and upon said driving-shaft, a pressure-head upon the inner end of said hoisting-shaft, a pressure coupling or device arranged between said head and said member, and the slot-and-pin connections between said driving-shaft, hoisting-shaft and member, substantially as and for the purpose specified.

7. In a mechanical friction-brake, the combination with the casing adapted to contain a lubricant, provided at one end with a friction-head and at the other with a thrust-bearing, a driving-shaft extending through said casing, a hoisting-shaft held by said thrust-bearing and having a slot-and-key connection with said driving-shaft, a friction member mounted on said driving-shaft and having a slot-and-key connection therewith, means actuated by the relative rotary movement of said hoisting-shaft and said member to force said member into strong frictional engagement with the friction-head of said casing when said hoisting-shaft is turned backwardly and relieve such frictional engagement when the driving-shaft is rotated in either direction, substantially as described.

8. In a mechanical friction-brake, the combination with the stationary casing, of the driving-shaft extending therethrough, the friction member mounted on said shaft and in said casing, the friction-disks interposed between said member and the end of said casing, said disks being alternately attached to said member and said casing, a hoisting-shaft, a thrust-bearing therefor, a pressure-head upon said hoisting-shaft, pressure means interposed between said pressure-head and said member, and driving means provided between said driving-shaft, hoisting-shaft and member, substantially as described.

9. In a mechanical friction-brake, the combination with a stationary friction member, of a revoluble friction member, a driving-shaft and a load-shaft, a pressure-head provided in connection with said load-shaft, having a suitable thrust-bearing, angular pressure-exerting means provided between said pressure-head and said revoluble friction member, and means whereby the positive and reverse operations of said driving-shaft cause the positive rotation of said pressure-head and said revoluble friction member, respectively, substantially as described.

10. In a mechanical friction - brake, the combination with a stationary friction member of a revoluble friction member, a load-shaft, a thrust-bearing therefor, toggle-links provided between said load-shaft and said revoluble friction member for exerting pressure upon the latter when the said load-shaft is turned backwardly, and means for positively driving said load-shaft and said revoluble friction member in opposite directions, the one not positively driven, in each case, following the other, substantially as described.

11. In a mechanical friction - brake, the combination with a stationary friction member, of a driving-shaft, a load-shaft, a friction member mounted on said driving-shaft and having a slot-and-key connection therewith, a pressure - head having a suitable thrust-bearing and having a slot-and-key connection with said driving-shaft, and the ball-headed links connecting said revoluble member and said driving - shaft, substantially as described.

12. In a mechanical friction - brake, the combination with the casing 2 having the ends 3 and 4, of the driving-shaft 7 and the load-shaft 8, the friction member 11 and the pressure - head 10 within said casing, said head being fixed to said load-shaft 8, the slot-and-key connections between said driving-shaft and said member and said head, a thrust-bearing interposed between said head and said end 4 of the casing, the friction-multiplying disks interposed between said member 11 and said head 3 and the angular toggle-links arranged between said member 11 and head 10, substantially as described.

13. In a mechanical friction - brake, the combination with the casing 2 having the ends 3 and 4, of the driving-shaft 7 and the load-shaft 8, the friction member 11 and the pressure - head 10 within said casing, said head being fixed to said load-shaft 8, the slot-and-key connections between said driving-shaft and said member and said head, a thrust-bearing interposed between said head and said end 4 of the casing, the friction-multiplying disks interposed between said member 11 and said head 3 and the angular toggle-links arranged between said member 11 and head 10 and having universal pivot connection therewith, substantially as described.

14. In a mechanical friction-brake, the combination of the casing 2 having the head or ends 3 and 4, with the driving-shaft 7 extending through said ends, the load-shaft 8 extending through the end 4 and having the pressure-head 10 within the casing, a thrust-bearing for said head, the friction member 11 mounted on the shaft 7, said member and said head having slot-and-key connection with said driving-shaft, the friction-multiplying disks interposed between said member 11 and said head 3, the spring 25 arranged between said head 10 and said member 11 and the angular pressure-exerting means arranged between said head 10 and said member 11, substantially as described.

15. In a mechanical friction-brake, the combination with a stationary casing, of the driving-shaft extending from one end of said casing and the load-shaft extending from the other end thereof, a revoluble friction member arranged in the driving-shaft end of said casing and pressure-exerting means in the load-shaft end of said casing, said pressure means being automatically operative by the load-shaft and positively operative by the driving-shaft, substantially as described.

In witness whereof I have hereunto set my hand, in the presence of two witnesses, this 21st day of September, 1901.

EDGAR P. COLEMAN.

In presence of—
C. G. HAWLEY,
J. W. BECKSTROM.

In witness whereof I have hereunto set my hand, in the presence of two witnesses, this 23d day of September, 1901.

SAMUEL E. HITT.

In presence of—
JOHN H. GREGG,
ALBT. J. EWING.